United States Patent [19]

Johannessen

[11] 4,191,992
[45] Mar. 4, 1980

[54] METHOD OF AND APPARATUS FOR ENABLING SOFT-FAILURE OF MODULAR POWER CONVERTER SYSTEMS, INCLUDING RF GENERATOR SYSTEMS, EMBODYING SWITCHING COMPONENTS IN THE POWER CONVERSION

[75] Inventor: Paul R. Johannessen, Lexington, Mass.

[73] Assignee: Megapulse Incorporated, Bedford, Mass.

[21] Appl. No.: 880,842

[22] Filed: Feb. 23, 1978

[51] Int. Cl.$^2$ ............................................. H02M 1/18
[52] U.S. Cl. ...................................... 363/50; 363/70; 307/86; 363/54
[58] Field of Search ........................ 363/50, 54, 57, 58, 363/65, 69, 70–71, 135, 136; 307/85, 86; 361/79, 93

[56] References Cited

U.S. PATENT DOCUMENTS

| 3,611,106 | 10/1971 | Mooney | 363/68 |
| 3,821,630 | 6/1974 | Kornrumpf et al. | 363/57 |
| 4,001,598 | 1/1977 | Johannessen | 307/106 |
| 4,039,925 | 8/1977 | Fletcher et al. | 363/70 |
| 4,047,235 | 9/1977 | Davis | 363/51 X |
| 4,084,221 | 4/1978 | Ogata | 363/68 X |

Primary Examiner—J. D. Miller
Assistant Examiner—Peter S. Wong
Attorney, Agent, or Firm—Rines and Rines

[57] ABSTRACT

The disclosure is concerned with enabling modular power converter systems, including RF generators or transmitters involving such conversion, employing switching components such as SCRs in the power conversion, to fail in a soft manner as a result of transient electrical or other disturbances so as to permit continued system operation, through the use of individual module d.c. power supplies and circuit design that insures inverter module high output impedance even under SCR failure conditions and that mitigates against SCR failures caused by changes in load phase angle.

20 Claims, 13 Drawing Figures

METHOD OF AND APPARATUS FOR ENABLING SOFT-FAILURE OF MODULAR POWER CONVERTER SYSTEMS, INCLUDING RF GENERATOR SYSTEMS, EMBODYING SWITCHING COMPONENTS IN THE POWER CONVERSION

The present invention relates to methods of and apparatus for power generation and conversion, being more particularly concerned with power converters and inverters, including frequency changers, DC-to-DC power converters, DC-to-AC power inverters, and RF generators or transmitters in which the basic power conversion is accomplished with the aid of switching devices, such as solid-state thyristors and the like— more particularly, SCR type devices. The invention is more specifically directed to enabling such systems to fail in a soft manner (that is, without causing shut-down of the overall system).

There are several problems that, over the years, have plagued power conversion systems of these types and have given rise to partial solutions, later discussed, that have not heretofore, however, reliably enabled soft failure, particularly if multiple component failures occur in the system. Such inadequacy has held back the complete automation of systems that have thus had to be humanly monitored. Among these are certain RF transmitters, as of the Loran navigation type, in which it is most desirable if remote stations can be rendered soft-failing with automatic substitution of a failed module.

For exemplary purposes, and for consideration of a preferred application and embodiment of the invention, reference will be made to such transmitters, as of the types disclosed in my U.S. Letters Pat. Nos. 3,889,263 and 4,001,598; it being understood, however, as later pointed out, that the techniques and apparatus of the invention are also useful with other power generators and conversion systems, as well, including those of other patents referenced in the above Letters Patent.

Turning, now, to the types of problems before mentioned, a first serious problem with power conversion equipment embodying SCR or similar switching devices (hereinafter illustratively described with reference to the SCR), resides in latch-up caused by false triggers such as those generated by line voltage transients, lightning transients, and failures in the control circuits. When an SCR latches, all the energy stored in the DC power supply connected to the latched SCR is dumped, resulting in a large current pulse. This current pulse may destroy the SCR, if proper protective circuitry is not provided. In most power conversion systems, unfortunately, SCR latch-up cannot be prevented. The system must, therefore, be designed such that SCR latch-up does not cause system outage or component failures; and approaches to solve this problem are described, for example, in my prior U.S. Letters Pat. No. 3,832,573. If resort is had to such devices as fast-acting fuses and the like for protecting the SCRs and other components, the converter will necessarily be out of action until the fuses are replaced. This condition is clearly not acceptable for automatic and similar operational requirements. An acceptable solution to this problem has been found in the design of the power converter circuits such that the latch-up current pulse is within the $i^2t$ rating of the SCRs, such that the latch-up current pulse can pass through the SCR without causing component failures.

In accordance with the present invention, this problem is solved by providing each SCR inverter module with its own separate, appropriate DC power supply, thereby minimizing the energy that is dumped when latch-up occurs and, in turn, minimizing the $i^2t$ rating of the SCR.

A second class of failure problem resides in SCR failures caused by weak triggers, causing inadequate turn-on of the SCR junction with resulting di/dt failure. This can be minimized by providing protective circuitry that inhibits SCR triggers when the trigger supply voltage is low. In addition, the SCR trigger circuit itself should always generate a normal trigger pulse in response to spurious noise inputs to the SCR trigger circuit. This kind of design minimizes the generation of weak triggers, but does not eliminate them altogether. For the purposes of the present invention, the power converter system, therefore, must be able to tolerate a failed SCR in an inverter module without shutting down the entire system or inducing failures in other inverter modules.

In accordance with the present invention, the output impedance of the inverter module is made high when the module is inactive, even when the inverter SCR has failed. Thus, the failed module does not short-circuit the output of the power converter and the remaining inverter modules can continue to operate without any degradation in performance. This feature is obtained without the use of fuses or mechanical disconnecting devices. The failed module, furthermore, can be replaced with a functioning module without shutting down the power converter.

A third class of failure problem resides in SCR failures caused by high voltage transients generated when a change in the phase angle of the load occurs.

When driving a reactive load of varying phase angle (tuned antennas, AC motor, etc.), the amount of energy delivered to the load varies over a large range. In certain cases, energy flows from the load back into the inverter stage such that high voltages may be generated in the inverter which can cause SCR and other component failures.

In accordance with the present invention, however, SCR failures caused by changes in the phase angle of the load are eliminated in two ways. First, the inverter modules are designed to absorb power from, as well as deliver power to, the load; and secondly, the voltage across the SCR is monitored, and when this voltage reaches a critical value, the SCR trigger is inhibited, thereby preventing any further increase in the SCR voltage.

The power converter method and system of this invention, accordingly, admirably solves all of the above-mentioned problems and provides reliable, uninterruptable output power even in the event of component failures.

It is thus an object of the present invention to provide a new and improved method of and apparatus for enabling the soft-failure of modular power converter systems and the like, embodying switching components such as SCRs in the conversion process, and including RF generators or transmitters employing such power conversion techniques.

A further object is to provide such a novel method and apparatus for producing an improved solution of the long-plaguing problems of SCR latch-up caused by false triggers, SCR failures caused by weak triggers, and SCR failures caused by high-voltage transients generated by a change in phase angle of the load; it being understood that where all these problems are not present or are all not pressing, such combinations of the complete invention may be used for the solution of any one or more of these problems.

Still a further object is to provide an improved modular power conversion apparatus, and one that is particularly adapted to automatic operation irrespective of module failures.

Other and further objects will be explained hereinafter and are more particularly delineated in the appended claims. In summary, however, from one of its embracing aspects, the invention embraces a method of enabling soft failure of a power conversion system comprising a plurality of pulse generating modules embodying switching components such as SCRs that can fail by latch-up in response to false triggering, fail as a result of weak triggers, and fail as a result of high voltage transients, including those generated by a change in phase angle of the system load, said method comprising separately and independently supplying DC power to each module to minimize the energy dumped in latch-up and effectively to reduce the rating of the SCR; providing a high output impedance in each module when the same is inactive, including when there has been SCR failure, to enable the other modules of the system to continue to operate without degradation; and monitoring the voltage across the module SCR and responding to the reaching of a critical value of monitored voltage by thereupon inhibiting the trigger of the SCR, thereby to prevent any further increase in SCR voltage. Preferred embodiments, sub-combinations and details are hereinafter presented.

The invention will now be described with reference to the accompanying drawings, FIG. 1 of which is a basic block diagram of a preferred power converter system with which the invention may be used;

FIG. 2 is a more detailed block diagram of the pulse generator module of FIG. 1;

FIGS. 2 a through d are waveforms at indicated parts of the circuit of FIG. 2;

FIGS. 4 a and b are voltage and current waveforms, respectively, of the circuit of FIG. 3;

FIGS. 6 a and b are voltage and current waveforms respectively, of the circuit of FIG. 5.

Figure 1:
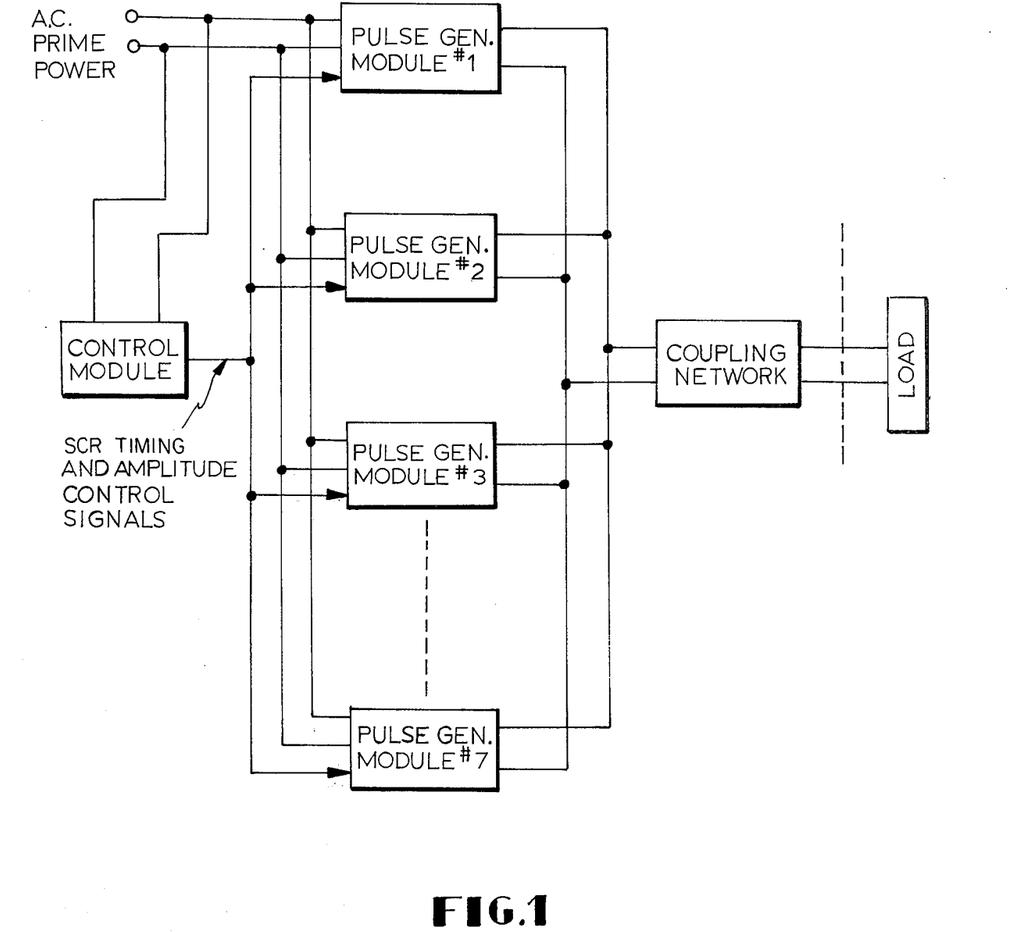

In the illustrative power converter of FIG. 1, the system consists of a control module, n pulse generator modules, and a coupling network feeding a load, all so-labelled. The number n of pulse generator modules is determined by the ratio of the total converter output power to the output power of each pulse generator module. This system may, for example, be of the type described in my said U.S. Letters Pat. No. 3,889,263 and the patents cited therein.

The control module generates the timing and amplitude control signals for the pulse generator modules. The outputs of the pulse generator modules are connected to a common bus which, in turn, feeds the coupling network, the output of which is connected to the load, as described in said Letters Patent. In most cases, the coupling network is a filter which eliminates high-frequency components at the output of the pulse generators.

Figures 2, 2A, 2B, 2C:
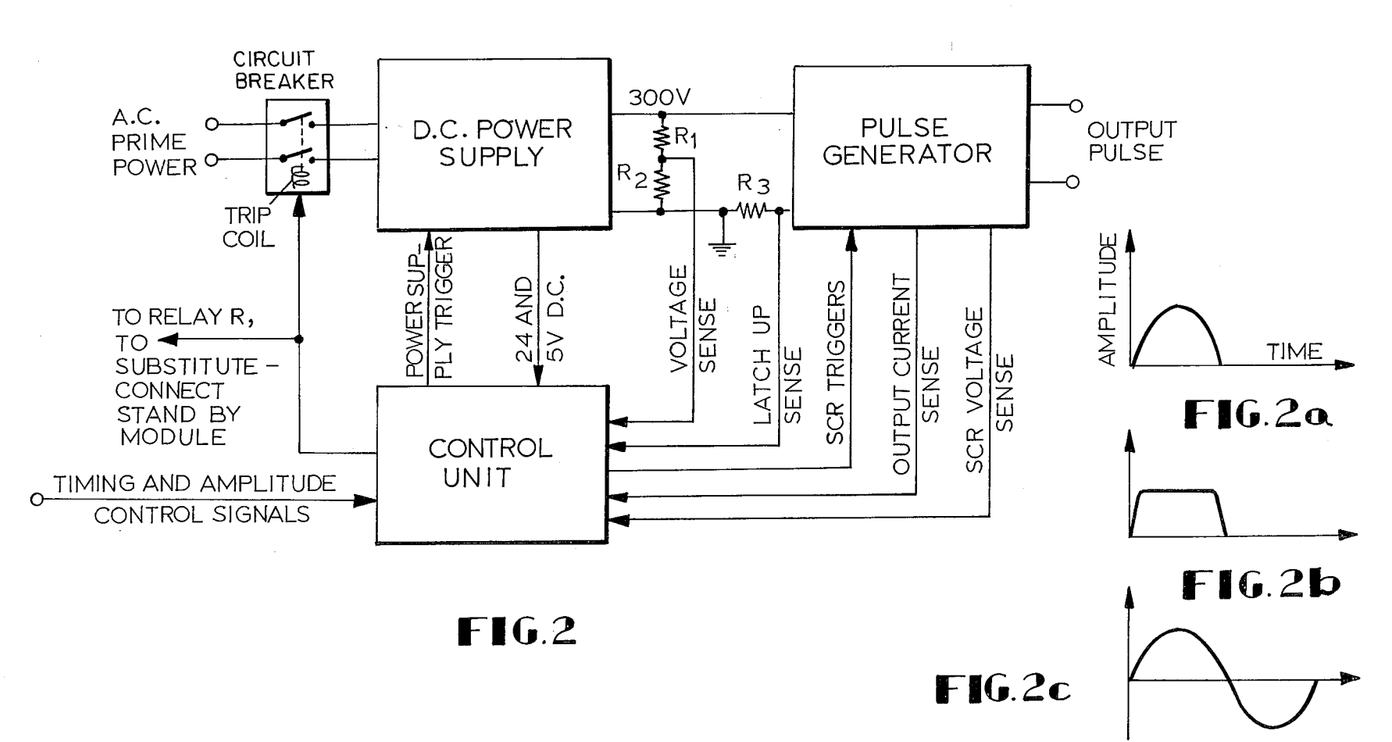
Figure 2D:
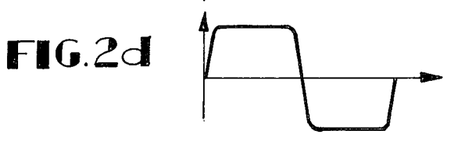

A block diagram of the pulse generator module is shown in FIG. 2. It consists of four units: circuit breaker, individual DC power supply, pulse generator, and control unit, all so-labelled. The circuit breaker connects AC prime power to the DC power supply unit. When a fault occurs in the pulse generator module, the circuit breaker trip coil is energized, thereby disconnecting AC prime power from the pulse generator module. The circuit breaker is also designed to trip if the AC current into the power supply unit exceeds the rated value.

The DC power supply unit generates all the DC voltages required to operate the pulse generator unit and the control unit. As shown in FIG. 2, typical voltages required for the transmitter applications of said last-named Letters Patent, for example, are 300 volts for the pulse generator unit, and 24 volts and 5 volts for the control unit. For certain applications, additional voltages may be required. The DC power supply unit must have a slow-start feature to limit the in-rush current during initial turn-on.

The pulse generator unit generates a high-power pulse which combines with the outputs of all the other pulse generator modules of FIG. 1 to form the desired output waveform, as explained in said last-named Letters Patent. This output pulse may be unipolar with respective voltage and current waveforms as shown in FIGS. 2 a and b, or bipolar, as shown in FIGS. 2 c and d. Many other waveforms, of course, are also producable. The inputs to the pulse generator unit are the DC power supply voltage (shown for purposes of illustration to be 300 volts) and SCR triggers from the control unit. To control the output pulse amplitude and timing, a feedback signal, termed "Output Current Sense", is fed to the control unit from the pulse generator unit. This signal is also used, in accordance with the invention, for fault detection purposes. To protect the SCRs in the pulse generator unit from overvoltage, an "SCR Voltage Sense" signal is also fed back to the control unit.

The control unit performs the following functions. It generates SCR trigger pulses for the power supply and pulse generator units, provides fault protection and latch-up protection, controls the main DC output voltage of the power supply unit, controls the amplitude and timing of the pulse generator output pulse, and generates the trip signal to the circuit breaker. The inputs to the control unit are shown as the timing and amplitude control signals, the voltage sense signal for the main DC power to the pulse generator unit, the latch-up sense signal, the output current sense and SCR voltage sense signals, before-mentioned, and the 24-volt and 5-volt DC voltages from the DC power supply unit.

The voltage sense signal provides the feedback signal to the control unit to regulate the power supply output DC voltages against AC voltage variations, in well-known fashion. If a fault occurs in the DC power supply unit that causes the voltages generated in this unit to go out of tolerance, therefore, the control unit trips the circuit breaker.

As before explained, SCR latch-up may be caused by two conditions: SCR failures, or spurious SCR trigger signals. It is of importance to distinguish between these two conditions. Spurious SCR trigger signals may be transient in nature, particularly those caused by line transients and lightning impulses. Such signals should not cause the circuit breaker to trip, unless these spurious signals cause component failure. When a latch-up condition occurs, therefore, the control unit inhibits both the DC power supply and the pulse generator SCR triggers, for a sufficient period of time, to allow the DC power supply completely to discharge and to reset the slow-start feature. Power supply triggers are then reapplied, and when the output DC voltage has reached the desired value, pulse generator triggers are reapplied. If normal operation results, no additional action is taken. If, however, the pulse generator latches immediately upon the application of the pulse generator trigger signals, the control unit trips the circuit breaker. Repeated latch-up of this nature thus indicates an actual component failure in the pulse generator module.

SCR overvoltage in the pulse generator unit is caused by either a change in the phase angle of the load or by improper timing of the output pulse. Both conditions may be transient in nature, and may occur during initial start-up or when a pulse generator module recovers from a latch-up. For these transient conditions, the circuit breaker should not trip; and proper transient overvoltage protection must be provided for the SCRs in the pulse generator unit. If the overvoltage condition exists for an extended period of time, however, a fault condition is indicated and the circuit breaker is tripped. This operation, as well as other failure-indications above discussed, may also cause a relay R (FIG. 2) automatically to connect a stand-by module in substitution, if desired. Again, adequate SCR overvoltage protection must be provided during this extended period.

Figure 3:
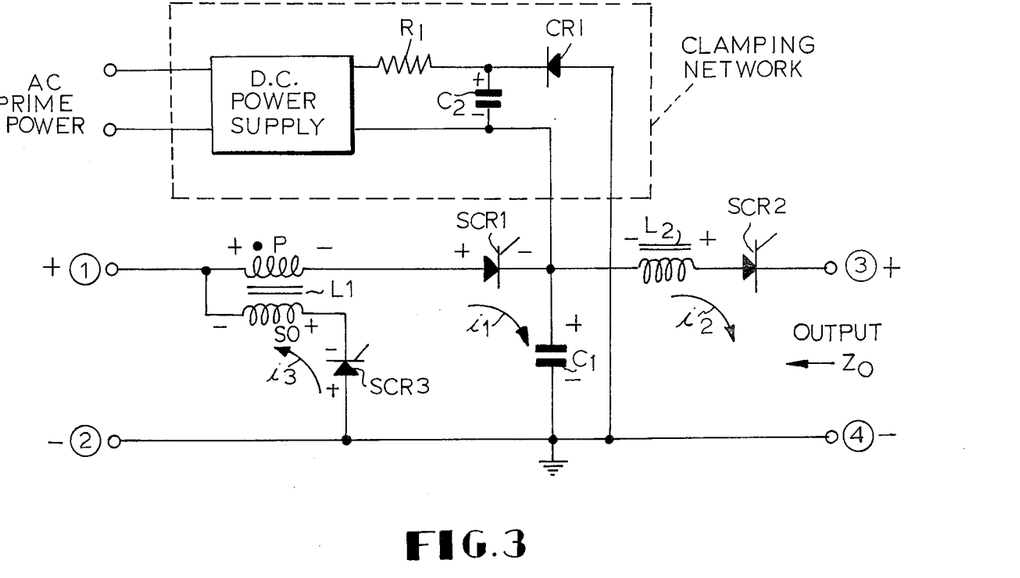
FIG. 3 is a circuit diagram of a preferred embodiment of pulse generator circuit for FIG. 2.

It is now in order to illustrate specific circuits that can achieve these operational requirements. A preferred circuit for Pulse Generator #1 is shown in FIG. 3. This circuit consists of a two-winding inductor L1 with primary winding P connected in series with SCR1 and secondary winding S in series with SCR3. The cathode of SCR1 is connected to the junction of shunt capacitor C1 and inductor L2. Inductor L2, in turn, is connected in series with SCR2. The anode of SCR3 is connected to ground. Across capacitor C1 is connected a clamping network consisting of diode CR1, capacitor C2, resistor R1, and an individual D.C. power supply.

Figure 4A:
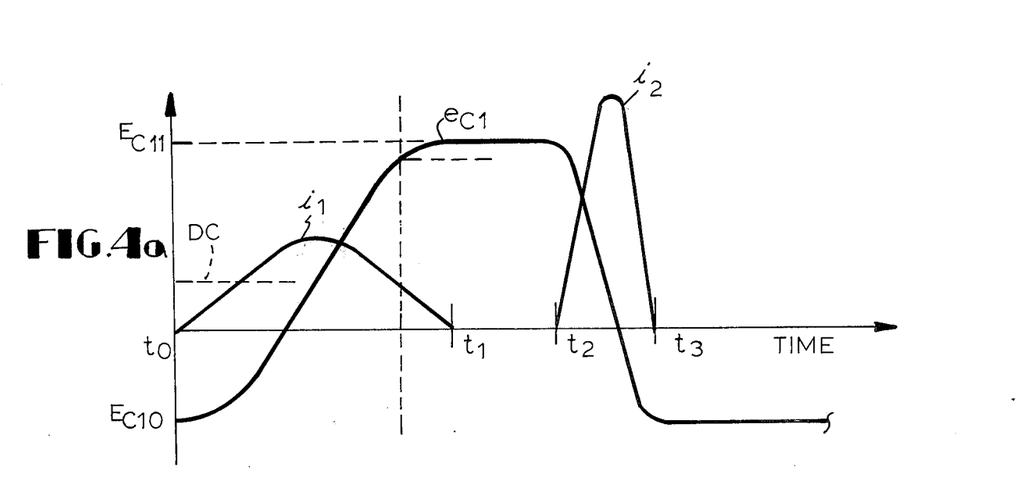
Figure 4B:
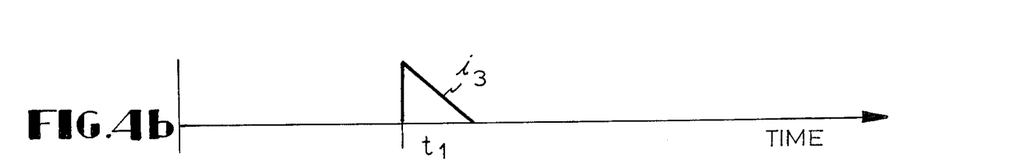

The operation of this circuit is explained with the aid of the voltage and current waveforms shown in FIGS. 4 a and b. Initially, the voltage on capacitor C1 is negative and of magnitude $E_{c10}$. SCR1 is turned on at time $t_0$ and capacitor C1 is resonantly charged to the value $E_{c11}$ during the charging interval $t_0$ to $t_1$. The charging current $i_1$ is half a sine-wave, as shown in FIG. 4a. Amplitude regulation of the C1 voltage ($e_{c1}$) is obtained by means of the secondary winding S on L1 and SCR3. During the latter part of the charging interval, $t_0$ to $t_1$, the voltage across the secondary winding S of L1 is negative and of greater magnitude than the D.C. power supply voltage. Thus, the voltage across SCR3 is positive. By turning SCR3 on (at time $t_1$), the voltage across SCR1 is caused to go negative. This action turns SCR1 off, the current through SCR1 is transferred to SCR3 (as shown in FIG. 4b), and the energy stored in L1 is returned to the power supply. In this manner, instantaneous voltage regulation can be achieved. At time $t_2$, some time after $t_1$, SCR2 is turned on, and the energy on C1 is transferred to the load in the form of a sinusoidal current pulse $i_2$. The time interval $t_1$ to $t_2$ must be of sufficient duration to allow SCR1 to recover.

When discharging capacitor C1 into the load, the voltage on C1 reverses polarity. The magnitude of this voltage reversal depends upon the characteristics of the load. If the load is resistive, most of the energy on C1 is delivered to the load and the reverse capacitor voltage is low. For a purely reactive load, the reverse negative voltage is equal to the positive voltage. For energy-storage loads, such as high Q tuned circuits and rotating machinery, the load voltage may be negative when C1 is discharged. For this case, energy is absorbed from the load and the reverse voltage on C1 becomes much greater than the positive voltage. Since the forward voltage across SCR1 is the sum of the C1 reverse voltage and the D.C. power supply voltage, this large C1 reverse voltage may cause the SCR1 forward voltage rating to be exceeded. One method of reducing the C1 reverse voltage is to connect the before-described clamping network (diode CR1, capacitor C2, resistor R1, and the D.C. power supply) across C1, as shown in FIG. 3. The D.C. power supply charges capacitor C2 through resistor R1 to the maximum acceptable reverse C1 voltage. Thus, if the C1 reverse voltage tends to exceed the C2 voltage, the diode CR1 conducts and clamps the C1 voltage to the C2 voltage. Note that the capacitance of C2 is designed to be much greater than C1, such that effective clamping is accomplished. If the negative output voltage exists for an extended period of time, the C2 voltage builds up, and the SCR voltage sense circuit, FIG. 2, alarms the control unit, which, in turn, generates SCR1 trigger inhibit signals. Thus, in this manner, the C1 reverse voltage is prevented from exceeding the maximum acceptable value.

As mentioned previously, it is required that the output impedance of the pulse generator be high even when an SCR failure occurs. This feature permits a failed pulse generator module to stay on line without affecting the operation of the overall converter system. The pulse generator circuit of FIG. 3 is designed to have this property. When SCR2 fails, it becomes a short circuit; and the circuit output impedance is the series combination of L2 and C1. Since the inverter consists of a large number of pulse generator modules (FIG. 1) connected in parallel, each module output impedance magnitude, given by the expression $$|Z_0| = \sqrt{(\frac{1}{\omega C_1})^2 - (\omega L_2)^2} ,$$

is high compared to the load impedance.

Figure 5:
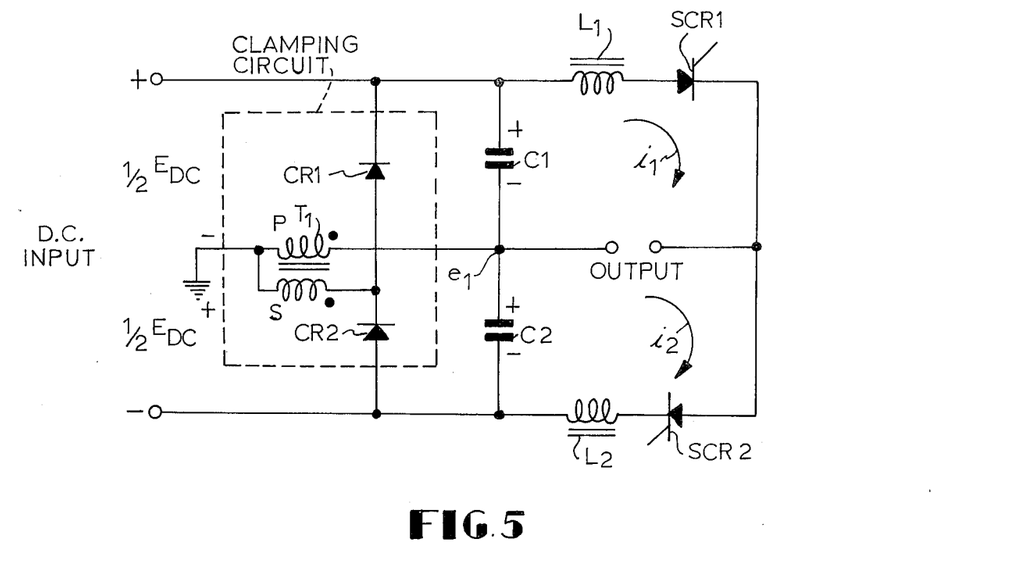
FIG. 5 is a circuit diagram of a different type of pulse generator that may be used in the system of FIGS. 1 and 2.
Figure 6A:
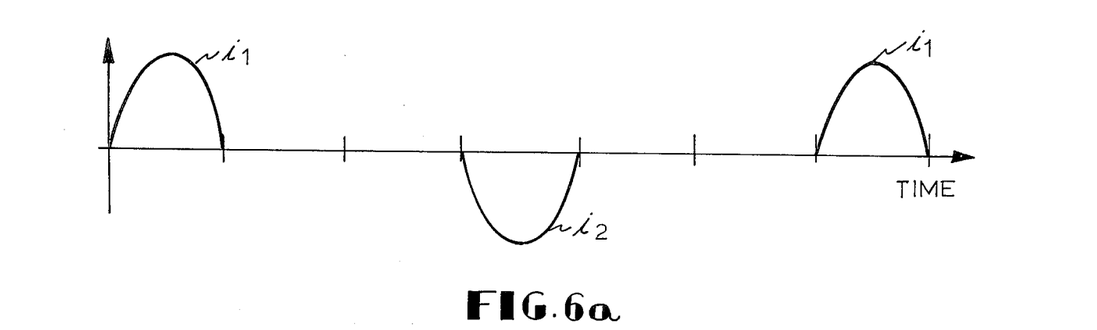
Figure 6B:
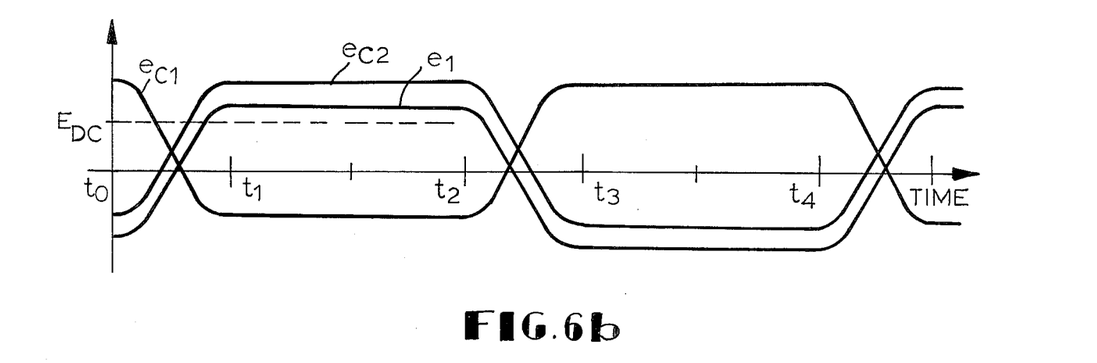

A different type of suitable pulse generator circuit is shown in FIG. 5. This circuit generates both negative and positive sinusoidal current pulses, as shown in FIG. 6a. The circuit consists of capacitors C1 and C2, series inductors L1 and L2, series thyristors SCR1 and SCR 2, and a clamping circuit consisting of diodes CR1 and CR2, and transformer T1. The operation of the circuit is as follows. Initially, at time $t_0$, FIG. 6 b, capacitor C1 is charged positively and capacitor C2 negatively. At time $t_0$, SCR1 is turned on, and a positive half sine-wave of current ($i_i$) is generated and delivered to the load during the time interval $t_0$ to $t_1$. At time $t_1$, both voltages on C1 and C2 have been reversed, such that the C2 voltage is positive ($e_{c2}$) and the C1 voltage is negative ($e_{c1}$). The next time interval, $t_1$ to $t_2$, must be sufficiently long to insure that SCR1 recovers. At time $t_2$, SCR2 is turned on, and a negative half-sine-wave of current ($i_2$) is generated and delivered to the load during the time interval $t_2$ to $t_3$. At time $t_3$, both voltages on C1 and C2 have been reversed, returning to the initial voltage polarities at time $t_0$. In the time interval $t_3$ to $t_4$, SCR2 recovers, and at time $t_4$, a new cycle of operation is initiated.

The relation between the forward and reverse capacitor voltages depends on the load characteristic. For a resistive load, energy is delivered to the load. Thus, for this case, the reverse capacitor voltage is less than the forward voltage, and this difference in capacitor voltage reflects the energy delivered to the load. For a regenerative load in which energy is delivered from the load to the pulse generator, on the other hand, the reverse capacitor voltage is greater than the forward voltage. For this last case, dangerous high voltages may be generated in the pulse generator circuit that may exceed the SCR maximum voltage rating. The clamping circuit (transformer T1 and diodes CR1 and CR2) eliminates these high voltages and thereby permits safe operation into regenerative loads.

When the load is resistive, the voltage at this common point is a symmetrical flat-topped wave shown as $e_1$ in FIG. 6 $b$. This voltage increases in magnitude when the load becomes reactive or regenerative. Even for a resistive load, the magnitude of the voltage $e_1$ exceeds the D.C. supply voltage $E_{DC}$. In order to clamp the $e_1$ voltage to a desired value, a secondary winding S is added to transformer T1. The turns ratio between the primary and secondary windings P and S is selected such that the secondary winding voltage is equal to one half the D.C. supply voltage ($E_{DC}$) when $e_1$ is equal to the desired clamping voltage. If $e_1$ increases beyond this value, either of the diodes CR1 or CR2 (depending upon voltage polarity) conducts and thus transfers energy back to the power supply. Thus, the voltage $e_1$ cannot exceed the clamping voltage level.

This circuit also has a high output impedance even when an SCR failure occurs. This output impedance is again represented by a series connection of an L and a C; in this case, L1 and C1, or L2 and C2.

As seen from FIG. 6 $a$ the output of the pulse generator circuit of FIG. 5 is bipolar, half-sine-wave current pulses. This circuit is ideally suited for use in high frequency power generation equipment, such as induction heating equipment and RF transmitters.

Figure 7:
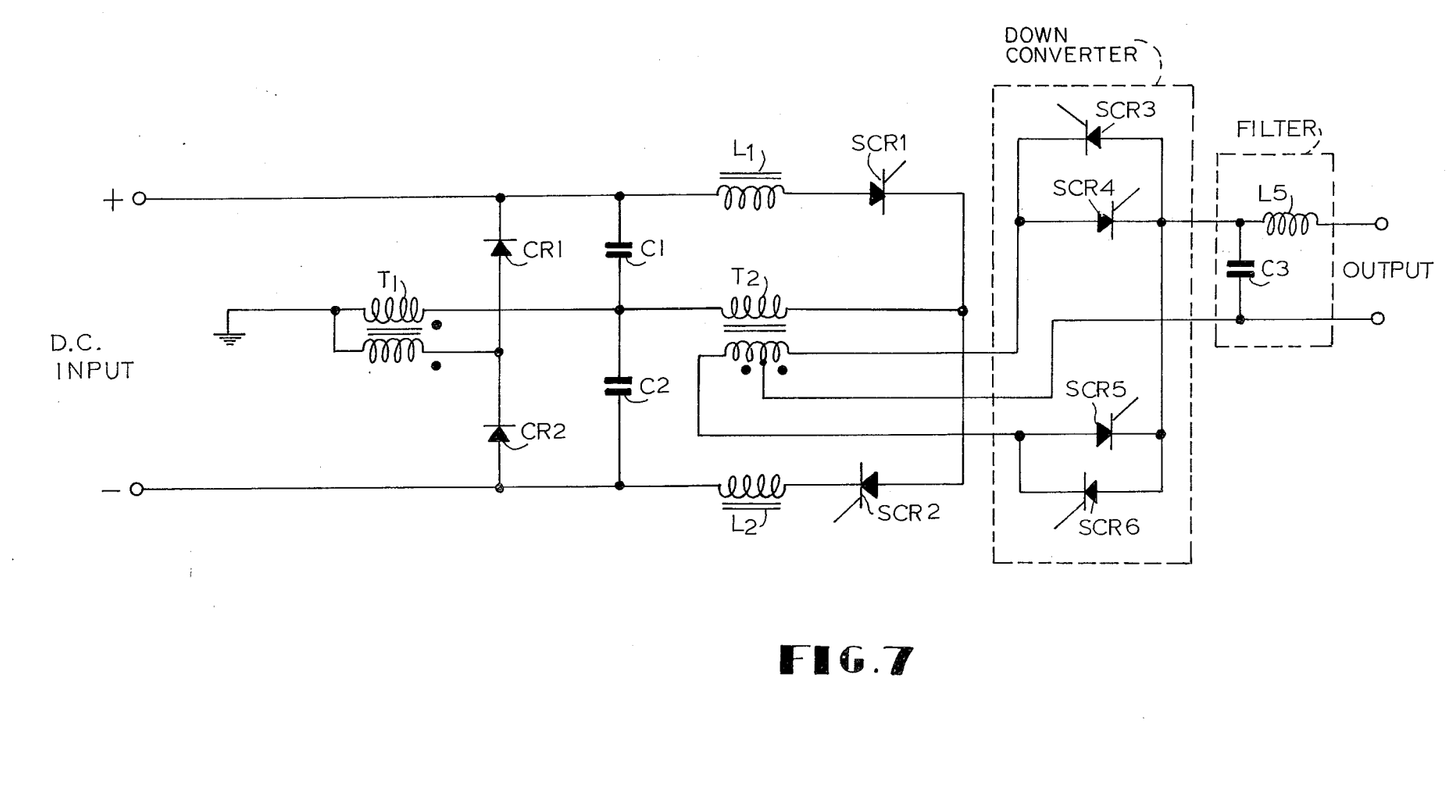
FIG. 7 is a circuit diagram of a low-frequency modification of the pulse generator of FIG. 5.

By adding a down converter (SCR3 through 6), coupled by transformer T2, and an appropriate output filter, (L5-C3), as shown in FIG. 7, this pulse generator circuit of FIG. 5 may be adapted to generate low frequency a.c. power, such as 60 Hz and 400 Hz.

Thus the method and apparatus of the invention, with its power conversion and RF generator systems using SCR circuits configured in a modular fashion, provides the followings features:

(1) The systems can withstand many types of transient electrical disturbance without physical damage or malfunction;

(2) The failure of any module component results only in the loss of function of that module without affecting the operation of the other modules or the performance of the system; and (3) Failed modules may be replaced and restored to operation without interruption of system operation. Such may be done automatically, as by a relay-controlled switch R of FIG. 2, responsive to the before-described signal indications of module failure remotely to insert a standby module in substitution.

Further modifications will also occur to those skilled in this art, and such are considered to fall within the spirit and scope of the invention as defined in the appended claims.

What is claimed is:

1. A method of enabling soft failure of a power conversion system comprising a plurality of pulse generating modules connected to a system load and embodying switching components such as SCRs that can fail by latch-up in response to false triggering, fail as a result of weak triggers, and fail as a result of high voltage transients, including those generated by a change in phase angle of the system load, said method comprising, separately and independently supplying to each module main DC power that is switched by the switching components, whereby the energy dumped in latch-up is minimized and the rating of the SCR is effectively reduced; providing in each module an output impedance that is high relative to the load impedance when the module is inactive, including when there has been an SCR failure, to enable the other modules of the system to continue to operate without degradation; and monitoring the voltage across the module SCR and responding to the increase of monitored voltage to a critical value by thereupon inhibiting the trigger of the SCR, thereby to prevent any further increase in SCR voltage.

2. A method as claimed in claim 1 and in which the further step is performed of effectively removing the failed module from influence in the system in response to an indication of its failure, and thereupon connecting a standby module in its place in the system.

3. A method as claimed in claim 1 and in which said modules are parallely connected and successively operated to generate successive portions of the waveform delivered to said load.

4. A method as claimed in claim 3 and in which said load comprises an antenna and the pulse generating modules are successively triggered to generate an RF waveform in said antenna.

5. A method of enabling soft failure of a power conversion system comprising a plurality of power-converting modules connected to a system load and embodying switching components such as SCRs that can fail by any of latch-up in response to false triggering, fail as a result of weak triggers, and fail as a result of high voltage transients, including those generated by a change in phase angle of the system load, said method comprising, separately and independently supplying to each module main DC power that is switched by the switching components, whereby the energy dumped in latch-up is minimized and the rating of the SCR is effectively reduced; providing in each module an output impedance that is high relative to the load impedance when the module is inactive, including when there has been an SCR failure, to enable the other modules of the system to continue to operate without degradation; and monitoring the voltage across the module SCR and responding to the increase of monitored voltage to a critical value by thereupon inhibiting the trigger of the SCR, thereby to prevent any further increase in SCR voltage.

6. A method of enabling soft failure of a power conversion system comprising a plurality of power-converting modules connected to a common load and embodying switching components such as SCRs that can fail by latch-up in response to false triggering, that comprises, separately and independently supplying to each module main DC power that is switched by the switching components, whereby the energy dumped in latch-up is minimized and the rating of the SCR is effectively reduced; indicating when latch-up failure has occurred; and effectively removing the failed module from influence in the system in response to such indication.

7. A method as claimed in claim 6 and in which the further step is performed of automatically connecting a standby module into the system in place of the failed module.

8. A method of enabling soft failure of a power conversion system comprising a plurality of power-converting modules connected to a common load and embodying switching components such as SCRs that can fail as a result of weak triggers, that comprises, providing in each module an output impedance that is high relative to the load impedance when the module is inactive, including when there has been an SCR failure, to enable the other modules of the system to continue to operate without degradation; indicating when such failure has occurred; and effectively removing the failed module from influence in the system in response to such indication.

9. A method as claimed in claim 8 and in which the further step is performed of automatically connecting a standby module into the system in place of the failed module.

10. A method of enabling soft failure of a power conversion system comprising a plurality of power-converting modules connected to a common load and embodying switching components such as SCRs that can fail as a result of high voltage transients, including those generated by a change in phase angle of the system load, said method comprising, monitoring the voltage across the module SCR, responding to the increase of monitored voltage to a critical value by thereupon inhibiting the trigger of the SCR, thereby to prevent any further increase in SCR voltage; and thereupon effectively removing the failed module from influence in the system in response to such inhibiting.

11. A method as claimed in claim 10 and in which the further step is performed of automatically connecting a standby module into the system in place of the failed module.

12. A method as claimed in claim 10 and in which the further step is performed of transferring energy back to the voltage supply for the module upon the exceeding of said critical value.

13. Power conversion apparatus having, in combination, a plurality of pulse generator modules having input circuits connected to a control module and output circuits coupled to a common load; each pulse generator module comprising a pulse generator comprising switching means such as SCRs, an individual DC power supply fed by circuit-breaker means from an AC power source to supply main DC power to the pulse generator that is switched by the switching means, and a control unit connected to said control module to receive timing and amplitude control signals therefrom and connected to trigger the DC power supply and the SCR operation in said pulse generator; a first feedback connection from the said pulse generator to said control unit sensing output current of the said pulse generator to control the output pulse amplitude and timing and to enable fault detection; a second feedback connection from the said pulse generator to said control unit sensing the SCR voltage to protect the SCR switching means in the pulse generator from overvoltage; a latch-up sense connection from the input of said pulse generator to said control unit; and means connected with said control unit and responsive to failure indication by any of the latch-up sensing, pulse generator output current and fault sensing, and SCR overvoltage sensing, for controlling said circuit breaker means to render the failed pulse generator module ineffective in said system.

14. Power conversion apparatus as claimed in claim 13 and in which means is provided, responsive to the control of the circuit breaker means, for substituting a standby module in said system for the failed module.

15. Power conversion apparatus as claimed in claim 13 and in which said control module sequentially triggers the pulse generator modules to cause the outputs thereof to combine to form a desired output waveform.

16. Power conversion apparatus as claimed in claim 15 and in which said load comprises antenna means, and the said outputs of the sequentially triggered modules generate a predetermined RF pulse waveform in said antenna means.

17. Power conversion apparatus as claimed in claim 13 and in which each DC power supply is adjusted to minimize the energy dumped in latch-up and effectively to reduce the SCR rating.

18. Power conversion apparatus as claimed in claim 13 and in which each pulse generator is adjusted to present a high impedance relative to the load impedance when the module is inactive, including when there has been SCR failure, to enable the other modules of the system to continue to operate without degradation.

19. Power conversion apparatus as claimed in claim 13 and in which means is provided for monitoring the voltage across the pulse generator SCR switching means and, upon the increase of monitored voltage to a critical value, thereupon indicating the same via said second feedback connection, and means responsive to said indicating for thereupon inhibiting further increase in SCR voltage.

20. Power conversion apparatus having, in combination, a plurality of power-converting modules feeding a common load and embodying switching components such as SCRs; means for sensing SCR failure caused by any of latch-up, weak triggering, and high voltage transients including those generated by a change in phase angle of said load; means responsive to said sensing for thereupon effectively removing the module with the SCR failure from influence in the operation of said apparatus; and means operative following such removing for substituting a standby module in the system for the failed module.

* * * * *